(12) United States Patent
Birks et al.

(10) Patent No.: US 6,373,530 B1
(45) Date of Patent: Apr. 16, 2002

(54) LOGO INSERTION BASED ON CONSTRAINED ENCODING

(75) Inventors: David Andrew Birks, Jackson; Robert Norman Hurst, Jr., Hopewell, both of NJ (US); Ragnar Hlynur Jonsson, Reykjavik (IS)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/126,974

(22) Filed: Jul. 31, 1998

(51) Int. Cl.[7] .............................. H04N 9/74; H04N 9/76; H04N 5/262; H04B 1/66
(52) U.S. Cl. ...................... 348/584; 348/584; 348/598; 348/578; 348/589; 348/239; 375/240.26; 375/240.28
(58) Field of Search .................................. 348/584, 598, 348/578, 239, 589; 375/240, 240.26, 240.28

(56) References Cited

U.S. PATENT DOCUMENTS

| 5,179,642 | A | * | 1/1993 | Komatsu | 395/135 |
|---|---|---|---|---|---|
| 5,594,507 | A | * | 1/1997 | Hoarty | 348/584 |
| 5,598,222 | A | * | 1/1997 | Lane | 348/568 |
| 5,808,695 | A | * | 9/1998 | Rosser et al. | 348/584 |
| 5,892,554 | A | * | 4/1999 | DeCicco et al. | 348/584 |
| 5,953,076 | A | * | 9/1999 | Astle et al. | 348/584 |
| 5,959,690 | A | * | 9/1999 | Toebes, VIII et al. | 348/578 |
| 6,041,068 | A | * | 3/2000 | Rosengren et al. | 370/538 |
| 6,067,117 | A | * | 5/2000 | Yamauchi | 348/390 |
| 6,072,536 | A | * | 6/2000 | Beacken et al. | 348/584 |
| 6,100,925 | A | * | 8/2000 | Rosser et al. | 348/169 |

* cited by examiner

Primary Examiner—Reinhard J. Eisenzopf
Assistant Examiner—Paulos Natnael

(57) ABSTRACT

When logos or other imagery are to be added to compressed digital video bitstreams, certain constraints are applied to the encoder that generates the original compressed bitstream to enable a video logo processor (e.g., at a local broadcaster) to insert logo-inserted encoded data into the bitstream without placing substantial processing demands on the video logo processor. In one embodiment, areas where logos can be inserted are identified and the encoder is not allowed to use image data within those logo areas as reference data when performing motion-compensated inter-frame differencing for pixels outside of the logo areas. Preferably, the compressed data corresponding to the desired location for logo insertion are extracted from the compressed bitstream and replaced by logo-inserted encoded data. As a result, logos can be inserted into compressed digital video bitstreams without having to completely decode and re-encode the bitstreams, while maintaining the overall quality of the video display.

22 Claims, 2 Drawing Sheets

LOGO INSERTION BASED ON CONSTRAINED ENCODING

BACKGROUND OF THE INVENTION

1. Field of the Invention

The present invention relates to digital video, and, in particular, to the insertion of logos into a compressed digital video bitstream.

2. Description of the Related Art

In the broadcast of normal analog (e.g., NTSC or PAL) television programs, it is common practice for the local broadcaster to insert its station logo on the network feed, for example, in a corner of the video display to identify the station. This is particularly true for cable television programming. This allows viewers to identify quickly what they are watching as they "channel surf," especially in these days when cable operators re-map channel assignments on their cable spectrum. A similar technique has recently come into use for TV program ratings, so that parents can immediately identify the rating of the program being watched. Inserting logos and other imagery into an incoming stream is very important in today's video markets.

In future digital television systems, television programs will be transmitted from a central network to a local broadcaster as compressed digital video bitstreams conforming, for example, to an MPEG video compression standard. As is the case with uncompressed analog TV programming, it is desirable to enable local broadcasters to insert logos or other imagery into compressed digital video streams before broadcasting the TV programs to their customers.

SUMMARY OF THE INVENTION

The present invention is directed to a scheme for inserting logos or other imagery into compressed digital video streams. In one embodiment, one or more constraints are applied while generating a compressed digital video bitstream from an original video stream, wherein the constraints are selected to take into account a subsequent insertion of the imagery into the compressed digital video bitstream. Imagery-inserted encoded data is subsequently inserted into the compressed digital video bitstream to generate an imagery-inserted compressed bitstream without fully decoding the compressed digital video bitstream.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
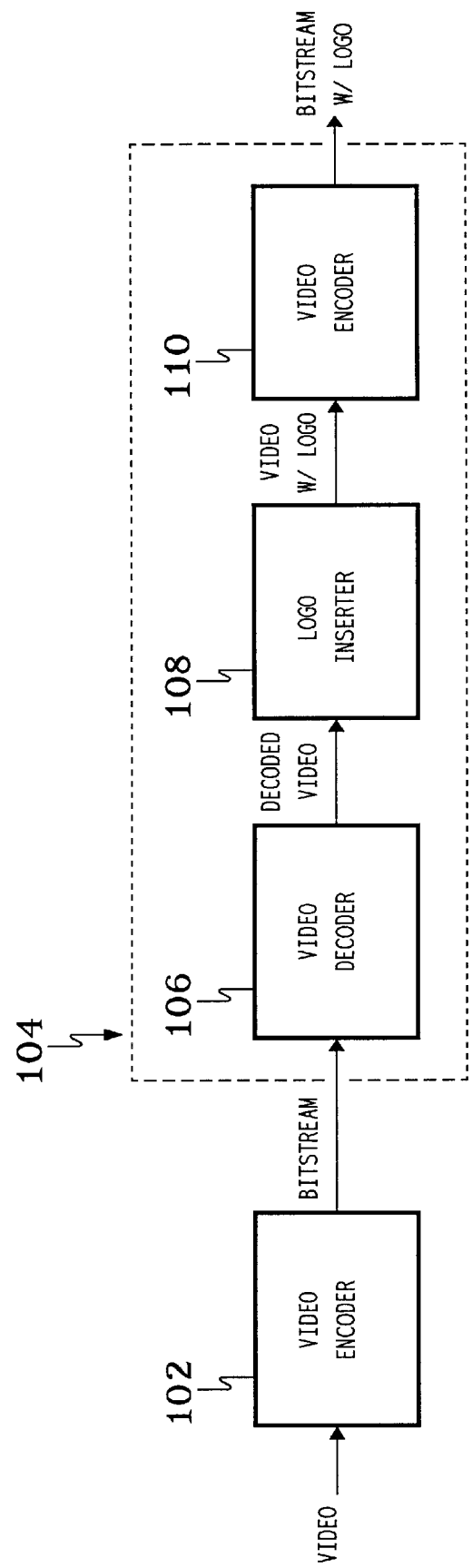
FIG. 1 shows one possible scheme for inserting logos or other imagery into compressed digital video streams.

FIG. 1 shows one possible scheme for inserting logos or other imagery into compressed digital video streams. According to FIG. 1, a video encoder 102 located, for example, at a central network compresses a video signal (analog or digital) to generate a compressed digital video bitstream which is then transmitted to a special video logo processor 104 at a local broadcaster. Video logo processor 104 comprises a video decoder 106, a logo inserter 108, and a video encoder 110, all of which operate to insert a logo or other imagery into the compressed digital video stream received from the central network.

In particular, video decoder 106 decodes the compressed digital video bitstream to generate a decoded video stream. At a certain level, video decoder 106 may be said to reverse the compression processing implemented by video encoder 102 at the central network.

Logo inserter 108 inserts a logo or other desired imagery into the decoded video stream to generate a video stream with an inserted logo. Depending on the implementation, logo inserter 108 works in either the analog domain or the digital domain. If analog, then logo inserter 108 can be identical to the existing components currently used to insert logos into analog television programs. If digital, then logo inserter 108 can operate in the pixel domain to overlay or blend the pixels of the logo with the pixels in the decoded video signal to generate digital video with an inserted logo.

In any case, video encoder 110 recompresses the video with the inserted logo to regenerate a compressed digital video bitstream corresponding to the video with the inserted logo. This logo-inserted bitstream is then broadcast by the local broadcaster to its customers.

The scheme depicted in FIG. 1 may be referred to as the full-decode/insert-logo/full-encode method.

In video compression algorithms, such as MPEG, a video sequence is encoded using different types of video frames. A key frame (also known as an intra or I frame) is a frame of video data that is encoded using only intra-frame encoding techniques without reference to any other frames. A predicted or P frame is a frame of video data that may be encoded using inter-frame encoding techniques, such as motion estimation, motion compensation, and inter-frame differencing, with reference to at least one other frame. In addition, a P frame may itself be a reference used to encode another frame. Like P frames, a disposable or B frame is a frame of video data that may be encoded using inter-frame encoding techniques with reference to at least one other frame. Unlike P flames and I frames, however, a B frame is never used as a reference for encoding another frame. As such, a B frame can be dropped from a video sequence without adversely affecting the playback of other frames; thus, the name disposable.

Video compression algorithms like MPEG encode video frames based on regions of pixels called blocks and macroblocks. For example, transforms such as the DCT transform are typically applied to (8×8) blocks of pixel data (i.e., either the pixels themselves or motion-compensated inter-frame pixel differences), while motion estimation and motion compensation are typically applied to (16×16) macroblocks of pixels. In motion-compensated inter-frame differencing, for a non-zero motion vector, a macroblock in one frame is encoded with reference to a (16×16) region of another frame that has a location within that frame that is different from the location of the macroblock in the first frame.

One advantage to the full-decode/insert-logo/full-encode method of FIG. 1 is that changes to each video frame due to the insertion of the logo are taken into account when the logo-inserted video is compressed by video encoder 110. In particular, changes to the logo areas in both I and P frames will be taken into account when motion estimation and motion-compensated inter-frame differencing are performed during the encoding of both P and B frames.

There are, however, a number of drawbacks to the full-decode/insert-logo/full-encode method for inserting logos into compressed digital video bitstreams. First of all, the scheme requires expensive equipment to completely decode and then re-encode the video stream. In addition, compression algorithms such as MPEG are lossy algorithms that rely on quantization and other steps that can adversely affect the quality of the decoded video. As such, the additional decoding and re-encoding steps in this scheme will only further diminish the quality of the final decoded video display at the customer.

One way to avoid some of the drawbacks to the full-decode/insert-logo/full-encode method of FIG. 1 is to process only those portions of the bitstream corresponding to the region where the logo will be inserted. Typically, a logo will correspond to only a small portion of the total video image, e.g., a small rectangular region at the bottom right corner of the display. If only the portion of the bitstream corresponding to the logo-insertion region is processed, then the entire bitstream does not have to be completely decoded and then re-encoded, and less expensive equipment may be able to be used. Unfortunately, because some or all of the original image data for the logo-insertion regions of I and P frames may have been used as reference data for encoding other P and B frames, the process of changing the encoded data in the bitstream for the logo-insertion region may result in unwanted artifacts in the regions surrounding the logo when the bitstream is finally decoded and displayed at the customer.

The present invention is directed to an alternative scheme for inserting logos or other imagery into compressed digital video bitstreams, such as those conforming to an MPEG video compression standard. According to this scheme, certain constraints are placed on the encoder that generates the original compressed digital video bitstream. These constraints allow logos or other imagery to be inserted into the compressed bitstream in an efficient manner that provides a high-quality video display at the customer.

There are two basic types of logo insertion methods. In one method, referred to herein as logo replacement, the logo replaces the original image data within the corresponding region. In this case, the logo-inserted encoded data that is placed in the compressed digital video bitstream is independent of the original image data for the corresponding region. As such, logo-inserted encoded data can be inserted into the compressed digital video bitstream by extracting the encoded bitstream data for the logo-insertion region and replacing it with the logo-inserted encoded data. Since the logo-inserted encoded data is independent of the original image data, the logo-inserted encoded data can be pre-computed prior to the logo insertion processing and the data extracted from the original bitstream can be discarded without having to decode it.

In the other method of logo insertion, referred to herein as logo blending, the logo is blended with the original image data such that the display of the logo-insertion region simultaneously presents some version of both the original imagery and the logo. In this case, the logo-inserted encoded data in the compressed digital video bitstream is dependent on the original image data for the corresponding region.

There are different ways of implementing the logo blending method of logo insertion. In one approach, the encoded bitstream data for the logo-insertion region is fully decoded to pixel values, which are then blended with pixel values for the logo in some appropriate manner (e.g., weighted averaging) to generate blended pixels, which are then encoded to generate the logo-encoded data for insertion back into the compressed digital video bitstream.

In another approach, the encoded bitstream data for the logo-insertion region is only partially decoded, for example, to recover transform coefficients (e.g., DCT coefficients). These transform coefficients are then blended with transform coefficients corresponding to the logo in some appropriate manner to generate blended transform coefficients that are then encoded to generate the logo-inserted encoded data for insertion back into the compressed digital video bitstream. In this case, the transform coefficients for the logo can be pre-computed. One advantage to this coefficient-level blending approach over the pixel-level blending approach is that the inverse and forward transforms do not have to be applied during the logo-insertion process, e.g., at the local broadcaster. As a result, less expensive equipment may be able to be used.

The present invention may be implemented for any of these approaches to logo blending as well as to the logo replacement method of logo insertion. According to the present invention, the encoder pre-defines one or more particular regions in the image data, referred to herein as the logo areas, as the areas in which a logo may be inserted. Constraints are then applied within the encoder dictating how the image data may be encoded with respect to the logo areas. These constraints may be selected to reduce the processing power required to insert logos and other imagery into the compressed digital video bitstream for the logo areas, e.g., at the local broadcaster. The constraints may also be selected such that the net picture quality at the customer is as good as or even better than the conventional full-decode/insert-logo/full-encode method of FIG. 1.

In a preferred embodiment of the present invention, the outer edges of each logo area coincides with macroblock boundaries. The following four constraints relate to the encoding of the original image data using motion-estimation and motion-compensated inter-frame differencing:

(1) Macroblocks outside of the logo areas are not allowed to make predictions based on the data within the logo areas. In other words, the encoder is not permitted to use image data within the logo areas of an I or P frame as reference data for encoding image data outside of the logo areas of a P or B frame.

(2) Macroblocks inside of the logo areas are not allowed to make predictions based on the data outside of the logo areas. In other words, the encoder is not permitted to use image data outside the logo areas of an I or P frame as reference data for encoding image data inside the logo areas of a P or B frame.

(3) Macroblocks inside the logo areas must use zero vectors. In other words, the encoder is not permitted to use motion estimation or motion compensation when implementing inter-frame differencing for image data inside the logo areas.

(4) Macroblocks inside the logo areas are intra-coded. In other words, the encoder is not permitted to use inter-frame differencing for encoding image data inside the logo areas.

These four constraints may be combined in the different ways to define the following four different levels of constraints:

Level (A): Constraint (1) only;
Level (B): Constraint (1) and (2);
Level (C): Constraint (1), (2), and (3); and
Level (D): Constraint (1) and (4).

Constraint Level (A) guarantees that the logo areas can be modified during logo insertion without having to worry about how the logo-encoded data may affect pixels outside of the logo areas. Constraint Level (B) means that the logo areas are encoded as isolated regions, with motion vectors never crossing the boundaries of the logo areas in either direction (i.e., inside out or outside in). Constraint Level (C) uses prediction, but not motion compensation. This would allow a stationary logo to be inserted by modifying only the I frames. Constraint Level (D) requires the logo areas to be intra-encoded, allowing processing without regard to other frames.

Adding constraints to an encoding process typically reduces playback image quality. Since Constraint Levels (A)–(D) are listed in order of increasing constraint, they are also listed in order of (probable) decreasing playback image quality. Constraint Levels (A)–(D) are also listed in order of decreasing processing demands during the logo-insertion process. As such, the constraint level can be selected to trade off between playback image quality and processing requirements.

When a logo is inserted into a compressed digital video bitstream, there may be a tendency for that insertion process to increase the number of bits needed to represent the logo-inserted bitstream. This issue may be dealt with as an issue exclusively for the logo inserter at the local broadcaster. Alternatively, an additional constraint could be placed on the encoder to leave some "bitrate headroom" (e.g., in the form of stuffing bytes) when the image data is originally encoded, giving the logo inserter some leeway in generating the logo-inserted encoded data. Otherwise, the quality of the logo area may drop after logo insertion. The constraint may be in the form of a specified headroom parameter at the encoder, where the parameter may be set to zero if no headroom is needed.

The syntax of the compressed digital video bitstream may need to be defined to signal that logo-insertion constraints have been applied at the encoder, and to what regions of the picture they have been applied. One way to identify a rectangular logo area in the bitstream is by the macroblock numbers of, for example, the upper left and lower right macroblocks in the logo area. Depending on the compression scheme (e.g., MPEG), this information may be carried in user-defined data. Alternatively, the locations of the logo areas could be defined as a network standard, which would then not need to be explicitly included in the bitstream.

In a slice-based compression scheme such as MPEG, logo areas are preferably encoded in whole slices. This may allow the encoded data for the region to be extracted from the bitstream without having to use a variable length decoder. The logo inserter may be able simply to pass the other bitstream data through without modification. This would reduce the complexity and cost of the logo inserter.

Figure 2:
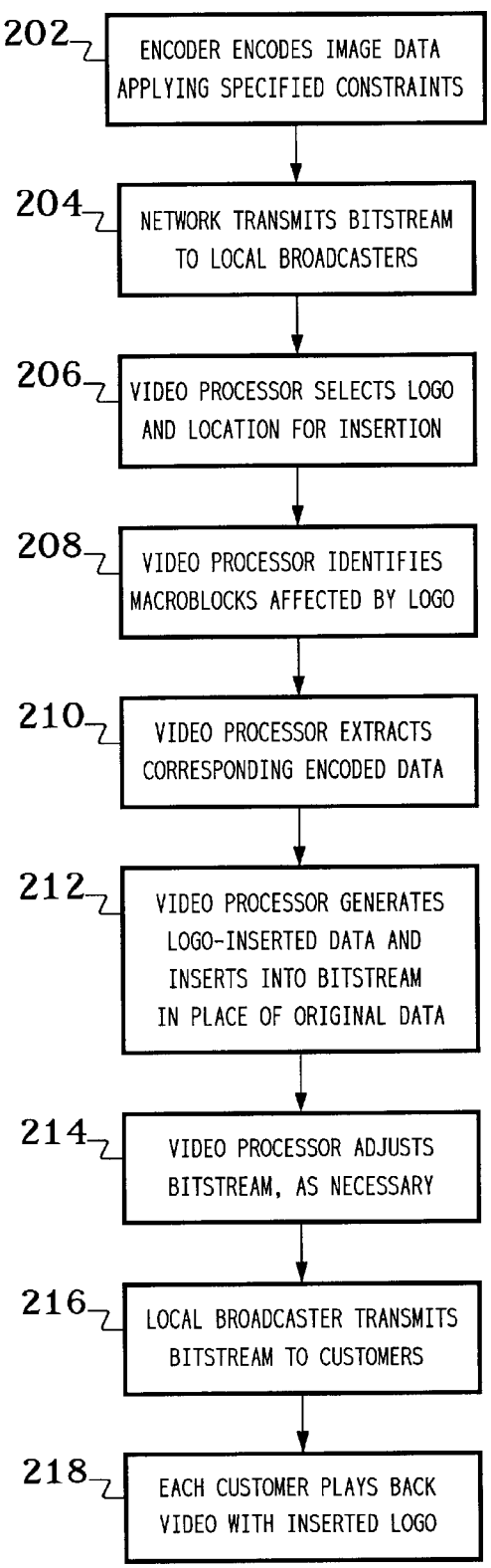
FIG. 2 shows a flow diagram of the processing involved in inserting logos or other imagery into compressed digital video bitstreams, according to one embodiment of the present invention.

FIG. 2 shows a flow diagram of the processing involved in inserting logos or other imagery into compressed digital video bitstreams, according to one embodiment of the present invention. The encoder at the network (e.g., 102 in FIG. 1) encodes the image data applying the selected constraints (step 202 of FIG. 2) and the network transmits the resulting compressed digital video bitstream to one or more local broadcasters (step 204). The video logo processor at a local broadcaster (e.g., 104 in FIG. 1) selects the logo and the desired location for its insertion in the video display (step 206) and identifies the macroblocks in the video display that will be affected by the logo based on the size of the logo and its desired location (step 208). The video logo processor then extracts from the compressed digital video bitstream the encoded data that correspond to the identified macroblocks (step 210) and replaces the extracted data with corresponding logo-inserted encoded data (step 212), where the logo-inserted encoded data corresponds to blocks of encoded pixels representing the logo.

As described earlier, there are different ways of generating the logo-inserted encoded data. For example, in some implementations, the logo-inserted encoded data is completely independent of the corresponding encoded data in the original compressed bitstream. In these implementations, the logo effectively replaces the corresponding macroblocks in the disposable frames of the original video display. In other implementations, the logo is blended with the original video data to achieve a more subtle insertion of the logo into the video display. This blending can be implemented at the pixel level or at the transform coefficient level. If at the pixel level, then the corresponding encoded data from the disposable frames need to be decoded all the way to pixels, which may then be blended (e.g., by weighted averaging) with pixels corresponding to the logo to generate blended pixels which are then recompressed to generate the logo-inserted encoded data. This process may require the application of an inverse (e.g., DCT) transform to recover the pixels from the original encoded data as well as the application of the forward transform to generate the logo-inserted encoded data from the blended data. If it is desirable to avoid the processing required by the application of inverse and forward transforms, in alternative implementations, the blending can be applied directly to the transform coefficients (without having to apply the inverse and forward transforms). In any case, the video logo processor inserts the resulting logo-inserted encoded data back into the compressed bitstream in step 212 in place of the original encoded data that were extracted during step 210.

If necessary, the video logo processor makes other adjustments to the compressed bitstream (step 214). For example, the replacement of the original encoded data with the logo-inserted encoded data may affect certain characteristics of the bitstream, such as byte alignment or bitrate. This bitstream adjustment may also involve removing some or all of the stuffing bytes that the encoder placed in the original bitstream to provide bitrate headroom to the video logo processor.

The local broadcaster then transmits the logo-inserted bitstream to it customers (step 216), which then playback to the bitstream to display the video stream with the inserted logo (step 218).

The present invention allows logos to be inserted without requiring the complete decoding and re-encoding of the bitstream. Depending on the implementation, no inverse or forward transforms need to be applied. The present invention can be implemented using a logo-insertion processor having a block diagram similar to that of video logo processor 104 of FIG. 1, although, under the present invention, the video decoder and video encoder can be greatly simplified, since they are not required to completely decode and re-encode, respectively, the entire compressed bitstream.

Although the present invention has been described in the context of video compression schemes conforming to an MPEG video compression standard, those skilled in the art will understand that the present invention can also be implemented in the context of other suitable video compression schemes.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for generating a compressed digital video bitstream from an original uncompressed video stream for subsequent insertion of imagery into the compressed digital video bitstream without having to fully decode the compressed digital video bitstream, comprising the steps of:
   (a) identifying one or more areas in the original uncompressed video stream for possible subsequent imagery insertion; and
   (b) applying one or more video encoding constraints while generating the compressed digital video bitstream from the original uncompressed video stream, wherein the video encoding constraints are selected to take into account the subsequent insertion of the imagery into the compressed digital video bitstream at the one or more areas such that imagery-inserted encoded data can be subsequently inserted into the compressed digital video bitstream to generate an imagery-inserted compressed bitstream without fully decoding the compressed digital video bitstream, wherein the one or more video encoding constraints comprise at least one of:
      (1) image data outside of the one or more areas may not be used as a reference for encoding image data inside of the one or more areas;
      (2) image data inside of the one or more areas may not be used as a reference for encoding image data outside of the one or more areas;
      (3) image data inside of the one or more areas may be encoded using predictive encoding, but only based on zero motion vectors;
      (4) image data outside of the one or more areas may be encoded using predictive encoding, but image data inside of the one or more areas must be intra-encoded; and
      (5) adding one or more stuffing bits into the compressed digital video bitstream to provide headroom for the subsequent imagery insertion.

2. The invention of claim 1, wherein one of the video encoding constraints is that image data outside of the one or more areas may not be used as a reference for encoding image data inside of the one or more areas.

3. The invention of claim 2, wherein one of the video encoding constraints is that image data inside of the one or more areas may not be used as a reference for encoding image data outside of the one or more areas.

4. The invention of claim 3, wherein one of the video encoding constraints is that image data inside of the one or more areas may be encoded using predictive encoding, but only based on zero motion vectors.

5. The invention of claim 2, wherein one of the video encoding constraints is that image data inside of the one or more areas must be intra-encoded.

6. The invention of claim 1, wherein one of the video encoding constraints is that image data inside of the one or more areas may not be used as a reference for encoding image data outside of the one or more areas.

7. The invention of claim 1, wherein one of the video encoding constraints is that image data inside of the one or more areas may be encoded using predictive encoding, but only based on zero motion vectors.

8. The invention of claim 1, wherein one of the video encoding constraints is that image data inside of the one or more areas must be intra-encoded.

9. The invention of claim 1, wherein:
   step (b) comprises the step of adding one or more stuffing bits into the compressed digital video bitstream to provide headroom for the subsequent imagery insertion by removing at least one of the one or more stuffing bits when the imagery-inserted encoded data is inserted into the compressed digital video bitstream.

10. The invention of claim 1, further comprising the steps of:
    (c) extracting encoded data from the compressed digital video bitstream, wherein the encoded data corresponds to a desired location for the imagery; and
    (d) replacing the extracted encoded data with imagery-inserted encoded data corresponding to the imagery to generate the imagery-inserted compressed bitstream.

11. The invention of claim 10, wherein step (d) further comprises the steps of:
    (i) at least partially decoding the extracted encoded data to generate at least partially decoded data;
    (ii) blending the at least partially decoded data with imagery data to generate imagery-inserted data; and
    (iii) encoding the imagery-inserted data to generate the imagery-inserted encoded data.

12. The invention of claim 11, wherein the blending is implemented on pixels.

13. The invention of claim 11, wherein the blending is implemented on transform coefficients.

14. The invention of claim 11, wherein:
    the imagery corresponds to a logo; and
    the compressed digital video bitstream is received by a local broadcaster from a central network and the imagery-inserted compressed bitstream is broadcast by the local broadcaster to its customers.

15. The invention of claim 1, wherein the imagery corresponds to a logo.

16. The invention of claim 1, wherein the compressed digital video bitstream is received by a local broadcaster from a central network and the imagery-inserted compressed bitstream is broadcast by the local broadcaster to its customers.

17. An apparatus for generating a compressed digital video bitstream from an original uncompressed video stream for subsequent insertion of imagery into the compressed digital video bitstream without having to fully decode the compressed digital video bitstream, comprising:
    (a) means for identifying one or more areas in the original uncompressed video stream for possible subsequent imagery insertion; and
    (b) means for applying one or more video encoding constraints while generating the compressed digital video bitstream from the original uncompressed video stream, wherein the video encoding constraints are selected to take into account the subsequent insertion of the imagery into the compressed digital video bitstream at the one or more areas such that imagery-inserted encoded data can be subsequently inserted into the compressed digital video bitstream to generate an imagery-inserted compressed bitstream without filly decoding the compressed digital video bitstream, wherein the one or more video encoding constraints comprise at least one of:
  (1) image data outside of the one or more areas may not be used as a reference for encoding image data inside of the one or more areas;
  (2) image data inside of the one or more areas may not be used as a reference for encoding image data outside of the one or more areas;
  (3) image data inside of the one or more areas may be encoded using predictive encoding, but only based on zero motion vectors;
  (4) image data outside of the one or more areas may be encoded using predictive encoding, but image data inside of the one or more areas must be intra-encoded; and
  (5) adding one or more stuffing bits into the compressed digital video bitstream to provide headroom for the subsequent imagery insertion.

18. An encoder for generating a compressed digital video bitstream from an original uncompressed video stream for subsequent insertion of imagery into the compressed digital video bitstream without having to fully decode the compressed digital video bitstream, wherein the encoder:
  (a) identifies one or more areas in the original uncompressed video stream for possible subsequent imagery insertion; and
  (b) applies one or more video encoding constraints while generating the compressed digital video bitstream from the original uncompressed video stream, wherein the video encoding constraints are selected to take into account the subsequent insertion of the imagery into the compressed digital video bitstream at the one or more areas such that imagery-inserted encoded data can be subsequently inserted into the compressed digital video bitstream to generate an imagery-inserted compressed bitstream without filly decoding the compressed digital video bitstream, wherein the one or more video encoding constraints comprise at least one of:
    (1) image data outside of the one or more areas may not be used as a reference for encoding image data inside of the one or more areas;
    (2) image data inside of the one or more areas may not be used as a reference for encoding image data outside of the one or more areas;
    (3) image data inside of the one or more areas may be encoded using predictive encoding, but only based on zero motion vectors;
    (4) image data outside of the one or more areas may be encoded using predictive encoding, but image data inside of the one or more areas must be intra-encoded; and
    (5) adding one or more stuffing bits into the compressed digital video bitstream to provide headroom for the subsequent imagery insertion.

19. A computer-readable medium having stored thereon a plurality of instructions, the plurality of instructions including instructions which, when executed by a processor, cause the processor to implement a method for generating a compressed digital video bitstream from an original uncompressed video stream for subsequent insertion of imagery into the compressed digital video bitstream without having to fully decode the compressed digital video bitstream, the method comprising the steps of:
  (a) identifying one or more areas in the original uncompressed video stream for possible subsequent imagery insertion; and
  (b) applying one or more video encoding constraints while generating the compressed digital video bitstream from the original uncompressed video stream, wherein the video encoding constraints are selected to take into account the subsequent insertion of the imagery into the compressed digital video bitstream at the one or more areas such that imagery-inserted encoded data can be subsequently inserted into the compressed digital video bitstream to generate an imagery-inserted compressed bitstream without fully decoding the compressed digital video bitstream, wherein the one or more video encoding constraints comprise at least one of:
    (1) image data outside of the one or more areas may not be used as a reference for encoding image data inside of the one or more areas;
    (2) image data inside of the one or more areas may not be used as a reference for encoding image data outside of the one or more areas;
    (3) image data inside of the one or more areas may be encoded using predictive encoding, but only based on zero motion vectors;
    (4) image data outside of the one or more areas may be encoded using predictive encoding, but image data inside of the one or more areas must be intra-encoded; and
    (5) adding one or more stuffing bits into the compressed digital video bitstream to provide headroom for the subsequent imagery insertion.

20. A method for inserting imagery into a compressed digital video bitstream, comprising the steps of:
  (a) applying one or more constraints while generating the compressed digital video bitstream from an original video stream, wherein the constraints are selected to take into account a subsequent insertion of the imagery into the compressed digital video bitstream; and
  (b) subsequently inserting imagery-inserted encoded data into the compressed digital video bitstream to generate an imagery-inserted compressed bitstream without fully decoding the compressed digital video bitstream, wherein:
    step (a) comprises the step of identifying one or more areas for possible subsequent imagery insertion, wherein one of the constraints is that image data inside of the one or more areas may be encoded using predictive encoding, but only based on zero motion vectors.

21. A method for inserting imagery into a compressed digital video bitstream, comprising the steps of:
  (a) applying one or more constraints while generating the compressed digital video bitstream from an original video stream, wherein the constraints are selected to take into account a subsequent insertion of the imagery into the compressed digital video bitstream; and
  (b) subsequently inserting imagery-inserted encoded data into the compressed digital video bitstream to generate an imagery-inserted compressed bitstream without fully decoding the compressed digital video bitstream, wherein:

step (a) comprises the step of adding one or more stuffing bits into the compressed digital video bitstream to provide headroom for the subsequent imagery insertion; and step (b) comprises the step of removing at least one of the one or more stuffing bits when the imagery-inserted encoded data is inserted into the compressed digital video bitstream.

22. A method for inserting imagery into a compressed digital video bitstream, comprising the steps of:

(a) applying one or more constraints while generating the compressed digital video bitstream from an original video stream, wherein the constraints are selected to take into account a subsequent insertion of the imagery into the compressed digital video bitstream; and (b) subsequently inserting imagery-inserted encoded data into the compressed digital video bitstream to generate an imagery-inserted compressed bitstream without fully decoding the compressed digital video bitstream, wherein step (b) comprising the steps of:

(1) extracting encoded data from the compressed digital video bitstream, wherein the encoded data corresponds to a desired location for the imagery; and (2) replacing the extracted encoded data with imagery-inserted encoded data corresponding to the imagery to generate the imagery-inserted compressed bitstream, wherein step (b)(2) further comprises the steps of:

(i) at least partially decoding the extracted encoded data to generate at least partially decoded data;

(ii) blending the at least partially decoded data with imagery data to generate imagery-inserted data, wherein the blending is implemented on transform coefficients; and (iii) encoding the imagery-inserted data to generate the imagery-inserted encoded data.

\* \* \* \* \*